United States Patent [19]

Horan et al.

[11] Patent Number: 5,857,086
[45] Date of Patent: Jan. 5, 1999

[54] APPARATUS METHOD AND SYSTEM FOR PERIPHERAL COMPONENT INTERCONNECT BUS USING ACCELERATED GRAPHICS PORT LOGIC CIRCUITS

[75] Inventors: Ronald Timothy Horan, Houston; Sompong Paul Olarig, Cypress, both of Tex.

[73] Assignee: Compaq Computer Corp., Houston, Tex.

[21] Appl. No.: 855,401

[22] Filed: May 13, 1997

[51] Int. Cl.$^6$ ........................................ G06F 13/00
[52] U.S. Cl. .................... 395/309; 395/306; 345/503; 345/519
[58] Field of Search ..................... 395/306, 308, 395/309, 311, 312; 345/503, 519, 520

[56] References Cited

U.S. PATENT DOCUMENTS

| | | | |
|---|---|---|---|
| 5,682,484 | 10/1997 | Lambrecht et al. | 395/308 |
| 5,740,387 | 4/1998 | Lambrecht et al. | 395/309 |
| 5,748,921 | 5/1998 | Lambrecht et al. | 395/308 |
| 5,754,801 | 5/1998 | Lambrecht et al. | 395/308 |

*Primary Examiner*—Meng-Ai T. An
*Assistant Examiner*—Xuong M. Chung-Trans
*Attorney, Agent, or Firm*—Paul N. Katz; Ronald L. Chichester; Frohwitter

[57] ABSTRACT

A multiple use core logic chip set is provided in a computer system that may be configured either as a bridge between an accelerated graphics port ("AGP") bus and host and memory buses, as a bridge between a 32 bit additional peripheral component interconnect ("PCI") bus and the host and memory buses, or as a bridge between a primary PCI bus and an additional PCI bus. The function of the multiple use chip set is determined at the time of manufacture of the computer system or in the field whether an AGP bus bridge or an additional 32 bit PCI bus bridge is to be implemented. The multiple use core logic chip set has an arbiter having Request ("REQ") and Grant ("GNT") signal lines for each PCI device utilized on the additional 32 bit PCI bus. Selection of the type of bus bridge (AGP or PCI) in the multiple use core logic chip set may be made by a hardware signal input, software during computer system configuration or power on self test ("POST"). Software configuration may also be determined upon detection of a PCI device connected to the common bus.

21 Claims, 14 Drawing Sheets

| AGP Pin # | | AGP only | AGP & PCI | PCI only | 3.3V PCI Pin # | |
|---|---|---|---|---|---|---|
| 1 | A | | 12V | | 2 | A |
| 1 | B | SPARE | | | | |
| 2 | A | SPARE | | | | |
| 2 | B | | 5.0V | | 5 | A |
| 3 | A | RESERVED GND | | | | |
| 3 | B | | 5.0V | | 5 | B |
| 4 | A | USB- | | | | |
| 4 | B | USB+ | | | | |
| 5 | A | | GND | | 3 | B |
| 5 | B | | GND | | 18 | A |
| 6 | A | | INTA# | | 6 | A |
| 6 | B | | INTB# | | 7 | B |
| 7 | A | | RST# | | 15 | A |
| 7 | B | CLK | | | | |
| 8 | A | | GNT# | | 17 | A |
| 8 | B | | REQ# | | 18 | B |
| 9 | A | | VCC3.3 | | 10 | A |
| 9 | B | | VCC3.3 | | 16 | A |
| 10 | A | ST1 | | | | |
| 10 | B | ST0 | | | | |
| 11 | A | | RESERVED | | 9 | A |
| 11 | B | ST2 | | | | |
| 12 | A | PIPE# | | | | |
| 12 | B | RBF# | | | | |
| 13 | A | | GND | | 15 | B |
| 13 | B | | GND | | 17 | B |
| 14 | A | SPARE | | | | |
| 14 | B | SPARE | | | | |
| 15 | A | SBA1 | | | | |
| 15 | B | SBA0 | | | | |
| 16 | A | | VCC3.3 | | 19 | B |
| 16 | B | VCC3.3 | | | | |
| 17 | A | SBA3 | | | | |
| 17 | B | SBA2 | | | | |
| 18 | A | | RESERVED | | 10 | B |
| 18 | B | SB_STB | | | | |
| 19 | A | GND | | | | |
| 19 | B | GND | | | | |
| 20 | A | SBA5 | | | | |
| 20 | B | SBA4 | | | | |
| 21 | A | SBA7 | | | | |
| 21 | B | SBA6 | | | | |
| 22 | A | | KEY | | 12 | A |
| 22 | B | | KEY | | 12 | B |
| 23 | A | | KEY | | 13 | A |
| 23 | B | | KEY | | 13 | B |

FIGURE 3A

| AGP Pin # 302 | | AGP only 304 | AGP & PCI 306 | PCI only | 3.3V PCI Pin # | |
|---|---|---|---|---|---|---|
| 24 | A | KEY | | | | |
| 24 | B | KEY | | | | |
| 25 | A | KEY | | | | |
| 25 | B | KEY | | | | |
| 26 | A | | AD30 | | 20 | A |
| 26 | B | | AD31 | | 20 | B |
| 27 | A | | AD28 | | 22 | A |
| 27 | B | | AD29 | | 21 | B |
| 28 | A | | VCC3.3 | | 21 | A |
| 28 | B | | VCC3.3 | | 25 | B |
| 29 | A | | AD26 | | 23 | A |
| 29 | B | | AD27 | | 23 | B |
| 30 | A | | AD24 | | 25 | A |
| 30 | B | | AD25 | | 24 | B |
| 31 | A | | GND | | 22 | B |
| 31 | B | | GND | | 24 | A |
| 32 | A | | RESERVED | | 11 | A |
| 32 | B | AD_STB1 | | | | |
| 33 | A | | C/BE_3# | | 26 | B |
| 33 | B | | AD23 | | 27 | B |
| 34 | A | Vddq3.3 | | | | |
| 34 | B | Vddq3.3 | | | | |
| 35 | A | | AD22 | | 28 | A |
| 35 | B | | AD21 | | 29 | B |
| 36 | A | | AD20 | | 29 | A |
| 36 | B | | AD19 | | 30 | B |
| 37 | A | | GND | | 28 | B |
| 37 | B | | GND | | 30 | A |
| 38 | A | | AD18 | | 31 | A |
| 38 | B | | AD17 | | 32 | B |
| 39 | A | | AD16 | | 32 | A |
| 39 | B | | C/BE_2# | | 33 | B |
| 40 | A | Vddq3.3 | | | | |
| 40 | B | Vddq3.3 | | | | |
| 41 | A | | FRAME# | | 34 | A |
| 41 | B | | IRDY# | | 35 | B |
| 42 | A | | | | | |
| 42 | B | | | | | |
| 43 | A | | GND | | 34 | B |
| 43 | B | | GND | | 35 | A |
| 44 | A | | | | | |
| 44 | B | | | | | |
| 45 | A | | VCC3.3 | | 27 | A |
| 45 | B | | VCC3.3 | | 31 | B |
| 46 | A | | DEVSEL# | | 37 | B |
| 46 | B | | TRDY# | | 36 | A |

FIGURE 3B

| AGP Pin # | | AGP only | AGP & PCI | PCI only | 3.3V PCI Pin # | |
|---|---|---|---|---|---|---|
| 47 | A | | STOP# | | 38 | A |
| 47 | B | Vddq3.3 | | | | |
| 48 | A | SPARE | | | | |
| 48 | B | | PERR# | | 40 | B |
| 49 | A | | GND | | 37 | A |
| 49 | B | | GND | | 38 | B |
| 50 | A | | PAR | | 43 | A |
| 50 | B | | SERR# | | 42 | B |
| 51 | A | | AD15 | | 44 | A |
| 51 | B | | C/BE 1# | | 44 | B |
| 52 | A | Vddq3.3 | | | | |
| 52 | B | Vddq3.3 | | | | |
| 53 | A | | AD13 | | 46 | A |
| 53 | B | | AD14 | | 45 | B |
| 54 | A | | AD11 | | 47 | A |
| 54 | B | | AD12 | | 47 | B |
| 55 | A | | GND | | 42 | A |
| 55 | B | | GND | | 46 | B |
| 56 | A | | AD9 | | 49 | A |
| 56 | B | | AD10 | | 48 | B |
| 57 | A | | C/BE 0# | | 52 | A |
| 57 | B | | AD8 | | 52 | B |
| 58 | A | Vddq3.3 | | | | |
| 58 | B | Vddq3.3 | | | | |
| 59 | A | | RESERVED | | 14 | A |
| 59 | B | AD STB0 | | | | |
| 60 | A | | AD6 | | 54 | A |
| 60 | B | | AD7 | | 53 | B |
| 61 | A | | GND | | 48 | A |
| 61 | B | | GND | | 56 | A |
| 62 | A | | AD4 | | 55 | A |
| 62 | B | | AD5 | | 55 | B |
| 63 | A | | AD2 | | 57 | A |
| 63 | B | | AD3 | | 56 | B |
| 64 | A | Vddq3.3 | | | | |
| 64 | B | Vddq3.3 | | | | |
| 65 | A | | AD0 | | 58 | A |
| 65 | B | | AD1 | | 58 | B |
| 66 | A | SMB1 | | | | |
| 66 | B | SMB0 | | | | |

FIGURE 3C

| AGP Pin # | | AGP only | AGP & PCI | PCI only | 3.3V PCI Pin # | |
|---|---|---|---|---|---|---|
| | | | | TRST# | 1 | A |
| | | | | −12V | 1 | B |
| 1 | A | | 12V | | 2 | A |
| | | | | TCK | 2 | B |
| | | | | TMS | 3 | A |
| 5 | A | | GND | | 3 | B |
| | | | | TDI | 4 | A |
| | | | | TDO | 4 | B |
| 2 | B | | 5.0V | | 5 | A |
| 3 | B | | 5.0V | | 5 | B |
| 6 | A | | INTA# | | 6 | A |
| | | | | 5V | 6 | B |
| | | | | INTC# | 7 | A |
| 6 | B | | INTB# | | 7 | B |
| | | | | 5V | 8 | A |
| | | | | INTD# | 8 | B |
| 11 | A | | RESERVED | | 9 | A |
| | | | | PRSNT1# | 9 | B |
| 9 | A | | VCC3.3 | | 10 | A |
| 18 | A | | RESERVED | | 10 | B |
| 32 | A | | RESERVED | | 11 | A |
| | | | | PRSNT2# | 11 | B |
| 22 | A | | KEY | | 12 | A |
| 22 | B | | KEY | | 12 | B |
| 23 | A | | KEY | | 13 | A |
| 23 | B | | KEY | | 13 | B |
| 59 | A | | RESERVED | | 14 | A |
| | | | | RESERVED | 14 | B |
| 7 | A | | RST# | | 15 | A |
| 13 | A | | GND | | 15 | B |
| 9 | B | | VCC3.3 | | 16 | A |
| | | | | | | |
| 8 | A | | GNT# | | 17 | A |
| 13 | B | | GND | | 17 | B |
| 5 | B | | GND | | 18 | A |
| 8 | B | | REQ# | | 18 | B |
| | | | | RESERVED | 19 | A |
| 16 | A | | VCC3.3 | | 19 | B |
| 26 | A | | AD30 | | 20 | A |
| 26 | B | | AD31 | | 20 | B |
| 28 | A | | VCC3.3 | | 21 | A |
| 27 | B | | AD29 | | 21 | B |
| 27 | A | | AD28 | | 22 | A |
| 31 | A | | GND | | 22 | B |
| 29 | A | | AD26 | | 23 | A |
| 29 | B | | AD27 | | 23 | B |

FIGURE 4A

| AGP Pin # | | AGP only | AGP & PCI | PCI only | 3.3V PCI Pin # | |
|---|---|---|---|---|---|---|
| 31 | B | | GND | | 24 | A |
| 30 | B | | AD25 | | 24 | B |
| 30 | A | | AD24 | | 25 | A |
| 28 | B | | VCC3.3 | | 25 | B |
| | | | | IDSEL | 26 | A |
| 33 | A | | C/BE 3# | | 26 | B |
| 45 | A | | VCC3.3 | | 27 | A |
| 33 | B | | AD23 | | 27 | B |
| 35 | A | | AD22 | | 28 | A |
| 37 | A | | GND | | 28 | B |
| 36 | A | | AD20 | | 29 | A |
| 35 | B | | AD21 | | 29 | B |
| 37 | B | | GND | | 30 | A |
| 36 | B | | AD19 | | 30 | B |
| 38 | A | | AD18 | | 31 | A |
| 45 | B | | VCC3.3 | | 31 | B |
| 39 | A | | AD16 | | 32 | A |
| 38 | B | | AD17 | | 32 | B |
| | | | | VCC3.3 | 33 | A |
| | | | | VCC3.3 | 33 | B |
| 39 | B | | C/BE 2# | | 33 | B |
| 41 | A | | FRAME# | | 34 | A |
| 43 | A | | GND | | 34 | B |
| 43 | B | | GND | | 35 | A |
| 41 | B | | IRDY# | | 35 | B |
| 46 | B | | TRDY# | | 36 | A |
| 49 | A | | GND | | 37 | A |
| 46 | A | | DEVSEL# | | 37 | B |
| 47 | A | | STOP# | | 38 | A |
| 49 | B | | GND | | 38 | B |
| | | | | VCC3.3 | 39 | A |
| | | | | LOCK# | 39 | B |
| | | | | SDONE | 40 | A |
| 48 | B | | PERR# | | 40 | B |
| | | | | SBO# | 41 | A |
| | | | | VCC3.3 | 41 | B |
| 55 | A | | GND | | 42 | A |
| 50 | B | | SERR# | | 42 | B |
| 50 | A | | PAR | | 43 | A |
| | | | | VCC3.3 | 43 | B |
| 51 | A | | AD15 | | 44 | A |
| 51 | B | | C/BE 1# | | 44 | B |
| | | | | VCC3.3 | 45 | A |
| 53 | B | | AD14 | | 45 | B |
| 53 | A | | AD13 | | 46 | A |
| 55 | B | | GND | | 46 | B |

FIGURE 4B

| AGP Pin # | | AGP only | AGP & PCI ⌐306 | PCI only ⌐408 | 3.3V PCI Pin # ⌐402 | |
|---|---|---|---|---|---|---|
| 54 | A | | AD11 | | 47 | A |
| 54 | B | | AD12 | | 47 | B |
| 61 | A | | GND | | 48 | A |
| 56 | B | | AD10 | | 48 | B |
| 56 | A | | AD9 | | 49 | A |
| | | | | M66EN | 49 | B |
| | | | | GND | 50 | A |
| | | | | GND | 50 | B |
| | | | | GND | 51 | A |
| | | | | GND | 51 | B |
| 57 | A | | C/BE 0# | | 52 | A |
| 57 | B | | AD8 | | 52 | B |
| | | | | VCC3.3 | 53 | A |
| 60 | B | | AD7 | | 53 | B |
| 60 | A | | AD6 | | 54 | A |
| | | | | VCC3.3 | 54 | B |
| 62 | A | | AD4 | | 55 | A |
| 62 | B | | AD5 | | 55 | B |
| 61 | B | | GND | | 56 | A |
| 63 | B | | AD3 | | 56 | B |
| 63 | A | | AD2 | | 57 | A |
| | | | | GND | 57 | B |
| 65 | A | | AD0 | | 58 | A |
| 65 | B | | AD1 | | 58 | B |
| | | | | VCC3.3 | 59 | A |
| | | | | VCC3.3 | 59 | B |
| | | | | REQ64# | 60 | A |
| | | | | ACK64# | 60 | B |
| | | | | 5V | 61 | A |
| | | | | 5V | 61 | B |
| | | | | 5V | 62 | A |
| | | | | 5V | 62 | B |

FIGURE 4C

APPARATUS METHOD AND SYSTEM FOR PERIPHERAL COMPONENT INTERCONNECT BUS USING ACCELERATED GRAPHICS PORT LOGIC CIRCUITS

CROSS REFERENCE TO RELATED PATENT APPLICATION

This patent application is related to U.S. patent application Ser. No. 08/853,289, filed 5/9/97, entitled "Dual Purpose Apparatus, Method And System For Accelerated Graphics Port And Peripheral Component Interconnect" by Ronald T. Horan and S. Paul Olarig, and is hereby incorporated by reference.

BACKGROUND OF THE INVENTION

1. FIELD OF THE INVENTION

The present invention relates to computer systems using a bus bridge(s) to interface a central processor(s), video graphics processor, memory and input-output peripherals together.

2. DESCRIPTION OF THE RELATED TECHNOLOGY

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Cyrix, IBM and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference.

The AGP interface specification uses the 66 MHZ PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/sec."). The remaining AGP specification does not modify the PCI Specification, but rather provides a range of graphics-oriented performance enhancements for use by the 3-D graphics hardware and software designers. The AGP specification is neither meant to replace nor diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having an additional PCI bus with multiple PCI card slots for accepting additional input-output devices such as a network interface card(s) ("NIC"), PCI/JPCI bridge, PCI/SCSI adapter, PCI/EISA/ISA bridge, a wide area network digital router, multiple head graphics, and the like.

AGP and PCI devices serve different purposes and the respective interface cards (e.g., AGP 3-D video controller and PCI NIC) are not physically or electrically interchangeable even though there is some commonality of signal f unctions between the AGP and PCI interface specifications. While AGP capabilities are very desirable in a personal computer utilizing 3-D graphics, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance of any personal computer product must be maximized while constantly reducing its manufacturing costs. To achieve a high performance to cost ratio, commonality of components and high volume of use are key factors. Thus, commonality of components such as logic circuits, printed circuit boards, microprocessors, computer boxes and power supplies, will drive the costs down for both workstations and servers. Also the high end workstations and network servers would benefit if one generic model of a personal computer could be effectively used in either capacity. Further benefits in reducing costs may be realized by using common components in portable and desktop (consumer and low end business) computers.

The PCI specification version 2.1 allows for a 33 MHz or 66 MHz, 32 bit PCI bus; and a 33 Mhz or 66 MHz, 64 bit PCI bus. The 33 MHz, 32 bit PCI is capable of up to 132 megabytes per second ("MB/s") peak and 50 MB/s typical, and the 66 MHz, 32 bit PCI bus; and the 33 MHz, 64 bit PCI bus are capable of up to 266 MB/s peak. The AGP bus is capable of up to 532 MB/s peak. PCI interface card vendors are moving toward either 66 MHz, 32 bit or 33 MHz, 64 bit compatible PCI cards for the enhance data throughput performance.

The PCI specification, however, only allows two PCI device cards (two PCI connectors) on a 66 MHz, 32 bit PCI bus, whereas, the 33 MHz, 64 bit PCI bus allows more than two PCI device cards. Both of these embodiments of the PCI specification have the same data throughput. The 33 MHz, 64 bit embodiment allows more PCI device cards on the PCI bus than does the 66 MHz, 32 bit embodiment, but requires more signal lines for operation thereof, i.e., 64 address/data lines versus only 32 address/data lines. The AGP specification comprises a superset of the 66 MHz, 32 bit PCI specification, but has even higher throughput when in its 2X mode.

What is needed is an apparatus, method, and system for a personal computer that may provide an additional 32 bit PCI bus when an AGP bus is not needed by utilizing multiple use high production volume logic and interface circuits having the capability of providing either a PCI or AGP interface.

OBJECTS OF THE INVENTION

It is therefore an object of the present invention to provide a core logic chip set configurable for an additional 32 bit PCI bus when an AGP bus is not needed by utilizing multiple use high production volume logic and interface circuits having the capability of providing either a PCI or AGP interface.

It is a further object of the present invention to provide a core logic chip set that may be used in a personal computer system for an additional 33 MHz or 66 MHz, 32 bit PCI bus when an AGP bus is not needed by utilizing multiple use high production volume logic and interface circuits having the capability of providing either a PCI or AGP interface.

It is another object to use an arbiter of the multiple use high production volume logic and interface circuits for either an AGP device or a plurality of PCI devices.

It is a further object of the present invention to provide a method and system for programming a core logic chip set to be a bridge between an additional PCI bus and the host and memory buses.

It is another object to use one of the arbiters of the multiple use core logic chip set for arbitration of a plurality of PCI devices on the additional PCI bus.

It is yet a further object to provide additional request and grant lines for each additional PCI card slot and PCI device on the additional PCI bus.

SUMMARY OF THE INVENTION

The above and other objects of the present invention are satisfied, at least in part, by providing in a computer system a multiple use core logic chip set that may be configured as either a bridge between an AGP bus and host and memory buses, or as a bridge between an additional 32 bit PCI bus and the host and memory buses. The function of the multiple use chip set is determined at the time of manufacture of the computer system or it may be changed in the field to an AGP bus bridge or an additional 33 MHz or 66 MHz, 32 bit PCI bus bridge. The core logic chip set has provisions for the 32 bit PCI and AGP interface signals and is adapted for connection to either an AGP bus or an additional 32 bit PCI bus. Selection of which type of bus bridge (AGP or PCI) the core logic of the present invention is to assume may be determined by the type of computer system printed circuit motherboard utilized with the core logic chip set. The core logic chip set of the present invention uses one of its arbiters for the additional PCI bus, and has Request ("REQ") and Grant ("GNT") signal lines for each PCI device connected to the additional 32 bit PCI bus.

An embodiment of the invention contemplates a multiple use core logic chip set which may be one or more integrated circuit devices such as an Application Specific Integrated Circuit ("ASIC"), Programmable Logic Array ("PLA") and the like. AGP or PCI device(s) may be embedded on the computer system motherboard, or may be on a separate card(s) which plugs into a corresponding card edge connector(s) attached to the system motherboard and connected to the multiple use core logic chip set through either an AGP or PCI bus.

This multiple use core logic chip set of the present invention may be used in conjunction with a specific use printed circuit motherboard for a workstation, personal computer, portable computer, or a network server. In this embodiment, the type of motherboard may be adapted to apply hardware signal inputs to the core logic chip set for determining the configuration (AGP or additional PCI) thereof. The multiple use core logic chip set may also be configured to provide the additional PCI bus by software selection and is within the scope of this invention.

An advantage of the present invention is being able to use the same multiple use core logic chip set across different types of computer products. This feature increases the quantity of these chip sets being manufactured, thus resulting in a corresponding decrease in the cost per chip set.

The multiple use core logic chip set of the present invention may be used in conjunction with a multiple use or universal printed circuit motherboard having provisions for either an AGP card connector or a PCI interface card edge connector(s). The multiple use core logic chip set is connected to a common AGP/PCI bus on the universal printed circuit motherboard. Either the AGP connector or the PCI connector(s) is attached to the motherboard and is connected to the common AGP/PCI bus. Thus, one motherboard and core logic chip set can satisfy the requirements for a computer system having either an AGP bus and primary PCI bus, or primary and secondary (additional) PCI buses.

As discussed above, the multiple use core logic chip set may have signal inputs for configuring whether it acts as an AGP interface or an additional PCI interface, however, it is also contemplated in the present invention that the multiple use chip set may be software programmed to select either the AGP or the additional PCI bus function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program which performs the discovery process may be referred to as the PCI bus enumerator.

According to the PCI specification, all PCI devices must implement a base set of configuration registers. The PCI device may also implement other required or optional configuration registers defined in the PCI specification. The PCI specification also defines configuration registers and information to be contained therein for an PCI compliant device so as to indicate its capabilities and system requirements. Once the information for all of the bus devices are determined, the core logic may be configured as an additional PCI bus interface by the startup software.

An advantage of the present invention is that software may determine at POST whether the AGP or additional PCI bus is to be supported by the core logic chip set. This feature makes the core logic chip set of the present invention compatible with any computer system used as a workstation, personal computer, portable, or network server by utilizing the appropriate system motherboard having provisions for the additional PCI bus and PCI card connector(s).

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIGS. 3A–3C are tables of the AGP bus signals and the corresponding AGP connector pin outs;

FIGS. 4A–4C are tables of the 32 bit PCI bus signals and the corresponding PCI connector pin outs;

DETAILED DESCRIPTION OF THE PREFERRED EMBODIMENTS

Figure 1:
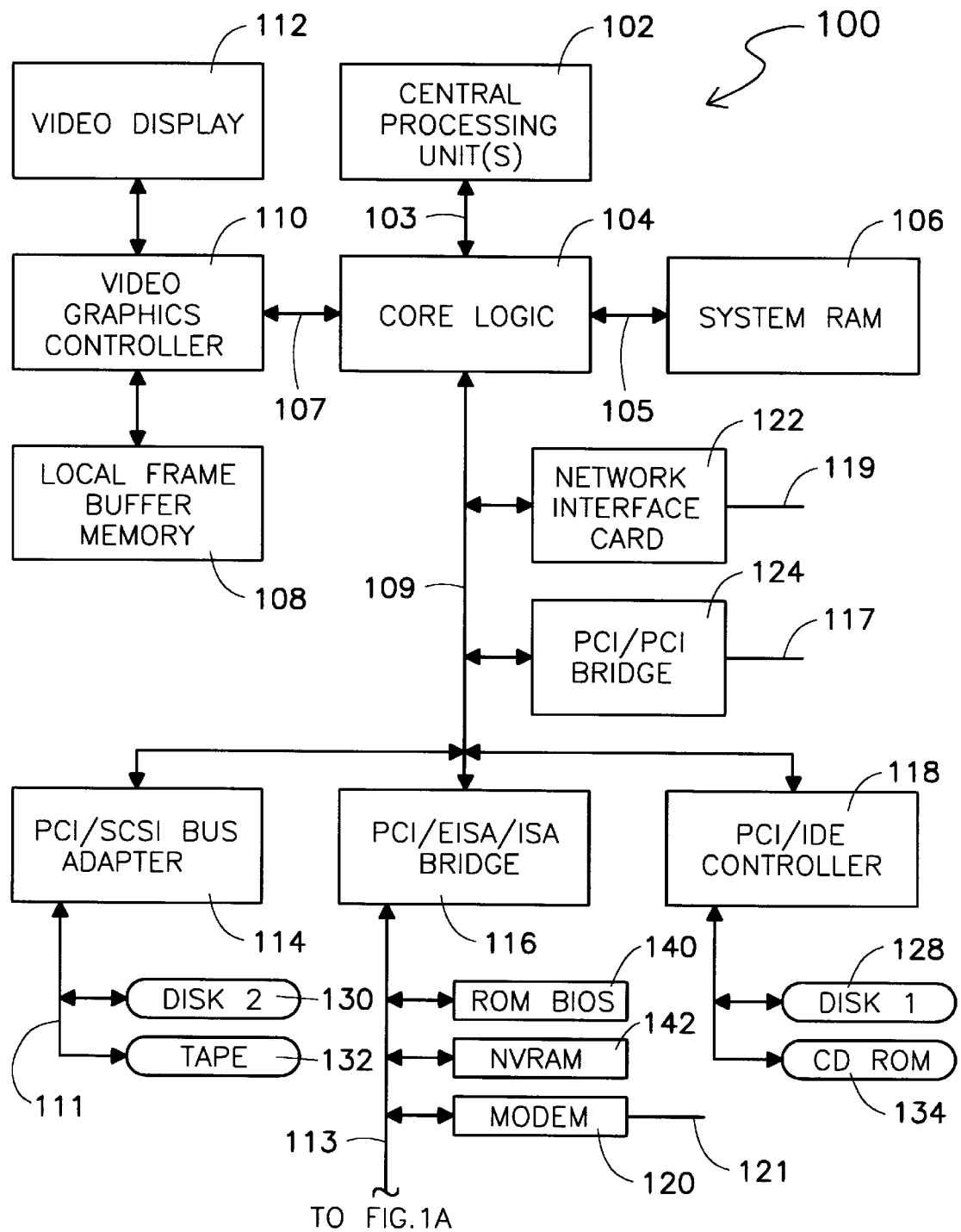
FIG. 1 is a schematic block diagram of a computer system.
Figure 1A:
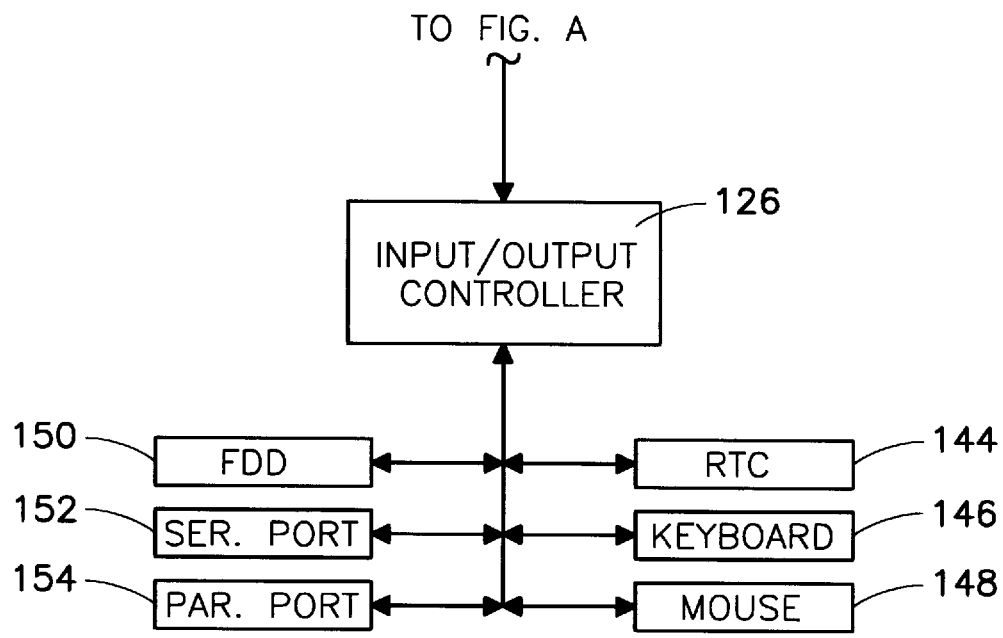

The present invention is an apparatus, method and system for providing in a computer system a multiple use core logic chip set capable of implementing either a bridge between the host and memory buses and a 32 bit AGP bus, or a bridge between the host and memory buses and an additional 32 bit PCI bus. Another embodiment of the multiple use core logic chip set of the present invention implements either a bridge between the host and memory buses and an AGP bus, or a bridge between the primary PCI bus and an additional PCI bus. Either implementation may be configured by hardware input signals to the multiple use core logic chip set or by software programming thereof.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having an additional 32 bit PCI bus for NICs, PCI/PCI bridge, PCI/SCSI bridge, and the like. Computers used as network servers require merely simple two dimensional ("2-D") graphics, thus the AGP bus is an overkill for this type of computer.

The AGP interface specification is a derivation or superset of the PCI interface specification and thus shares many common signal functions. Furthermore, the AGP bridge connects to the processor host bus and system memory bus through the computer system core logic chip set, thus it would be desirable to use the chip set logic and driver circuits of the AGP bridge as an additional PCI bridge. This enhances the versatility of the core logic chip set and reduces the overall cost of computer systems, both workstation and network servers, by having a common multiple use core logic chip set that could be manufactured in large volumes so as to cover all types of computer configurations. The 33 MHz, 64 bit PCI bus may have more than two PCI card slots for PCI device cards.

For illustrative purposes preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP specification entitled "Accelerated Graphics Port Interface Specification Revision 1.0," dated Jul. 31, 1996, as referenced above is readily available from Intel Corporation, and is hereby incorporated by reference. Further definition and enhancement of the AGP specification referenced above is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned co-pending U.S. patent application Ser. No. 08/853,289, filed May 9, 1997, entitled "Dual Purpose Apparatus, Method and System for Accelerated Graphics Port and Peripheral Component Interconnect" by Ronald T. Horan and S. Paul Olarig, and which is hereby incorporated by reference.

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system is generally indicated by the numeral 100 and comprises a central processing unit ("CPU") 102, core logic 104, system random access memory ("RAM") 106, a video graphics controller 110, a local frame buffer memory 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computers. The CPU 102 may be a plurality of CPUs 102 in a symmetric or asymmetric configuration.

The CPU 102 is connected to the core logic 104 through a host bus 103. The system RAM 106 is connected to the core logic 104 through a memory bus 105. The video graphics controller 110 is connected to the core logic 104 through an AGP or PCI bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122, and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134.

Figure 2:
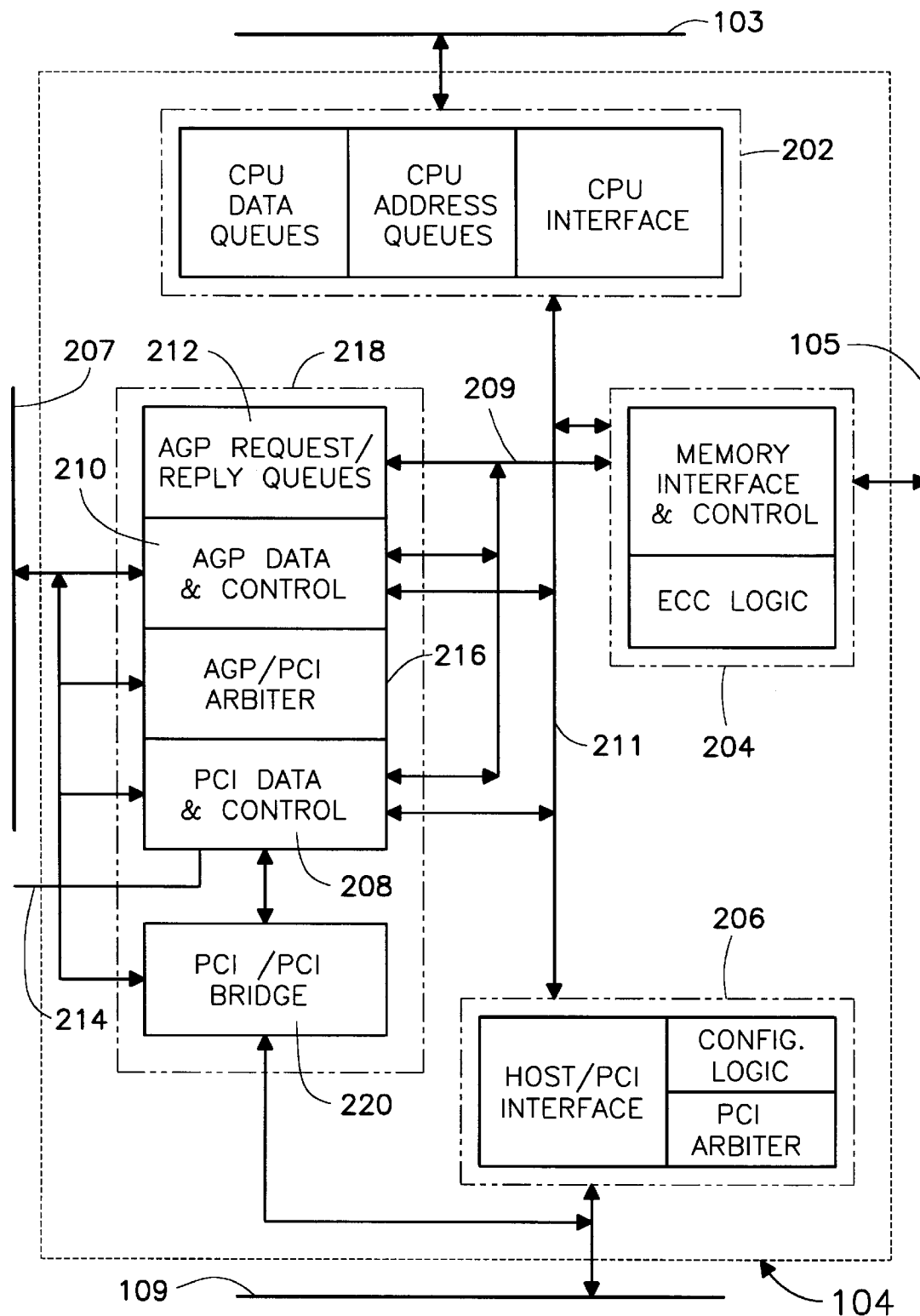
FIG. 2 is a schematic functional block diagram of the present invention according to the computer system of FIG. 1.

Referring now to FIG. 2, a schematic functional block diagram of the core logic 104 of FIG. 1, according to the present invention, is illustrated. The core logic 104 functionally comprises a CPU host bus interface and queues 202, memory interface and control 204, host/PCI bridge 206, and AGP/PCI logic 218. The AGP/PCI logic 218 comprises PCI data and control 208, AGP/PCI arbiter 216, AGP data and control 210, and AGP request/reply queues 212. The CPU host bus interface and queues 202 connects to the host bus 103 and includes interface logic for all data, address and control signals associated with the CPU 102 of the computer system 100. Multiple CPUs 102 and cache memory (not illustrated) are contemplated and within the scope of the present invention. The CPU host bus interface and queues 202 interfaces with the host/PCI bridge 206 and memory interface and control 204 over a core logic bus 211. The CPU host bus interface and queues 202 interfaces with the PCI data and control 208, and AGP data and control 210 over a core logic bus 211. The memory interface and control 204 interfaces with the PCI data and control 208, AGP data and control 210, and AGP request/reply queues 212 over a core logic bus 209. An advantage of separate buses 209 is that concurrent bus operations may be performed thereover. For example, video data stored in system RAM 106 may be transferring to the video graphics controller 110 (AGP device) while the CPU 102 on the host bus 103 is accessing an independent PCI device (i.e., NIC 122) on the PCI bus 109.

The host bus interface and queues 202 allows the CPU 102 to pipeline cycles and schedule snoop accesses. The memory interface and control 204 controls the control and timing signals for the computer system RAM 106 which may be synchronous dynamic RAM and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which insures that the next memory address is available on the memory bus 105 before the current memory cycle is complete. This results in minimum delay, if any, between memory cycles. The memory interface and control 204 also is capable of reading ahead on PCI initiator reads when a PCI initiator issues a read multiple command, as more fully described in the PCI specification.

The host/PCI bridge 206 controls the interface to the PCI bus 109. When the CPU 102 accesses the PCI bus 109, the host/PCI bridge 206 operates as a PCI initiator. When a PCI device is an initiator on the PCI bus 109, the host/PCI bridge 206 operates as a PCI target. The host/PCI bridge 206 contains base address registers for an AGP device target (not illustrated).

The AGP/PCI logic 218 comprises a PCI/PCI bridge 220, PCI data and control 208, AGP/PCI arbiter 216, AGP data and control 210, and AGP request/reply queues 212. The PCI data and control 208, AGP data and control 210, AGP/PCI arbiter and AGP request/reply queues 212 interface to a universal AGP/PCI bus 207 having signal, power and ground connections (not illustrated) for implementation of the AGP interface standard or the 32 bit PCI standard, An AGP/PCI control 214 may be used to select the personality function of the AGP/PCI logic 218 to be an AGP compliant interface or to be a PCI compliant interface, depending on the desired purpose of the computer system 100. The AGP/PCI control 214 may be implemented in hardware (jumper straps) or through software (configuration of personality registers in 208, 210 and 212). These personality registers are more fully defined in the AGP specifications incorporated herein by reference. The universal AGP/PCI bus 207 is adapted to connect to either an AGP connector or 32 bit PCI bus connectors as more fully described herein below.

The PCI/PCI bridge 220 is connected between the PCI bus 109 and the PCI data and control 208. The PCI/PCI bridge 220 need not be a complete and fully functional PCI to PCI bridge when the AGP/PCI logic 218 is functioning as an AGP compliant interface. In the AGP compliant mode, the purpose of the PCI/PCI bridge 220 is to allow the use of existing enumeration code (unmodified) to recognize and handle AGP or PCI compliant devices residing on the AGP/PCI bus 207. The PCI/PCI bridge 220, for example, may be used in determining whether an AGP device or a PCI device(s) is connected to the AGP/PCI bus 207 by bus enumeration during POST.

When selected as a PCI compliant interface, the AGP/PCI logic 218 functions with the same capabilities as the primary host/PCI bridge 206. In this case, the AGP/PCI logic 218 becomes a second host /PCI bridge and the AGP/PCI bus 207 becomes the second (additional) PCI bus in the computer system. The PCI bus 109 is the primary PCI bus and is assigned a logical PCI bus number of zero. The additional PCI bus (AGP/PCI bus 207) may typically be assigned a logical PCI bus number of one. It is contemplated, however, in the present invention that another embodiment thereof may present to the computer system 100 both PCI bus 109 and the additional PCI bus (AGP/PCI bus 207) as a single logical PCI bus number zero. This allows a single logical PCI bus to have more PCI connectors, i.e., more PCI cards on the same PCI bus number. Device arbitration and signal synchronization would be accomplished in the core logic 104 between the two host/PCI bridges.

In another embodiment when the AGP/PCI bus 207 is serving as an additional 32 bit PCI bus, the PCI/PCI bridge 220 in combination with AGP/PCI logic 218 may be used as a full function PC/PCI bridge between the PCI bus 109 and the AGP/PCI bus 207. In this embodiment of the present invention, transactions between the host bus 103 and the AGP/PCI bus 207 would have to go through both the host/PCI bridge 206 and the now fully functional PCI/PCI bridge 220.

Figure 2A:
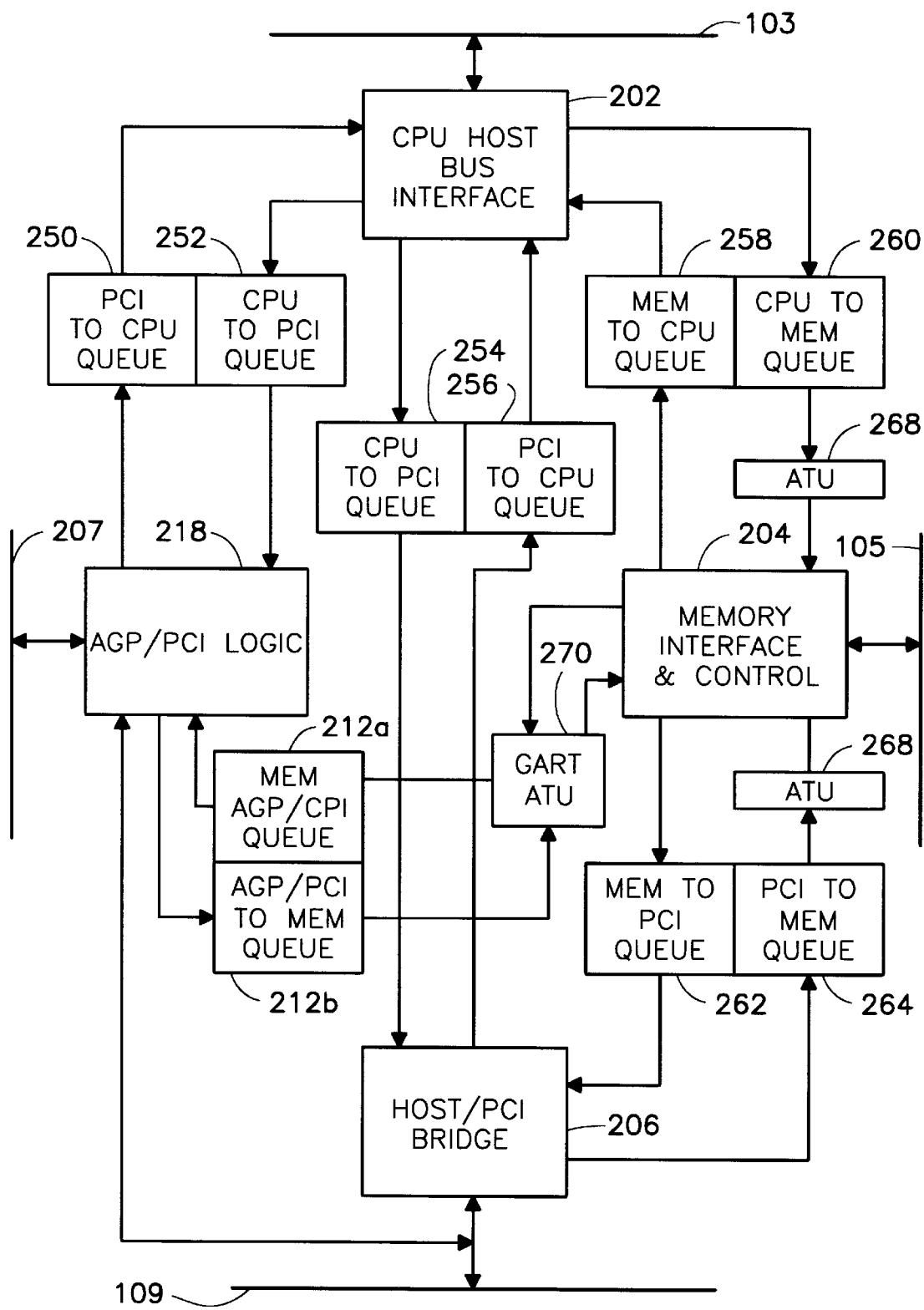
FIG. 2A is a data flow block diagram of FIG. 2.

Referring now to FIG. 2A, a data flow block diagram of the core logic 104 of FIG. 2, according to the present invention, is illustrated. The core logic 104 communicates through the various queues, read registers, and other control signals (not illustrated). Separating the major function blocks (202, 204, 206 and 218) as illustrated and coupling these function blocks together with read and write queues allows for a significant amount of concurrency in the computer system.

There are ten address and data queues illustrated in FIG. 2A. The queues receiving information (address and data) from the CPU are: CPU to memory queue 260, CPU to PCI queue 254, and CPU to PCI queue 252. Data directed to the system memory (RAM 106) has the respective base addresses translated to the system memory address space by address translation units ("ATU") 268.

The queues receiving information directed to the CPU are: memory to CPU queue 258, PCI to CPU queue 256, and PCI to CPU queue 250. Memory to PCI queue 262 receives information from the memory interface and control 204 that is directed to the host/PCI bridge 206. PCI to memory queue 264 receives information from the host/PCI bridge 206 that is directed to the memory interface and control 204. Memory to AGP/PCI queue 212a receives information from the memory interface and control 204 that is directed to the AGP/PCI logic 218. AGP/PCI to memory queue 212b receives information from the AGP/PCI logic 218 that is directed to the memory interface and control 204. A graphic address remapping table ("GART") ATU 270 translates the AGP texture data addresses to and from the system memory address space. The GART ATU 270 has a memory address table as more fully defined in the AGP specification.

The CPU to memory queue 260 handles CPU 102 posted writes to the RAM 106. The CPU to PCI queue 254 handles CPU 102 writes to the primary PCI bus 109. The CPU to PCI queue 252 handles CPU 102 writes to either an AGP device or a PCI device on the universal AGP/PCI bus 207.

The system memory (RAM 106) reads by the CPU 102 are queued in the memory to CPU queue 258. Reads from the PCI devices on the primary PCI bus 109 are queued in the PCI to CPU queue 256. Reads from the AGP device or PCI device(s) on the universal AGP/PCI bus 207 are queued in the PCI to CPU queue 250. With the queues 212a, 212b, 250, 252, the AGP IPCI logic 218 has the same capabilities as the host to PCI bridge 206 when configured as an additional host to PCI bridge.

Referring to now FIGS. 3A–3C and 4A–4C, tables of the AGP/PCI signals and the corresponding AGP (FIGS. 3A–3C) and PCI (FIGS. 4A–4C) connector pin outs, according to the AGP and PCI specifications, are illustrated. The 32 bit, 3.3 volt PCI connector pin out is represented in FIGS. 4A–4C for illustrative clarity, but the 3.3 volt, 5 volt and universal PCI card connector pin outs (as more fully defined in the PCI specification) are also contemplated and within the scope of the present invention. The universal AGP/PCI bus 207 is comprised of the AGP and PCI signals disclosed in FIGS. 3A–3C and 4A–4C, and the bus 207 is adapted for connection to a desired AGP connector, or 32 bit PCI connector(s). Selection of which interface specification the logic bridge conforms to (AGP or PCI) by the core logic 104 is controlled by the AGP/PCI control 214. The pins 302 of the AGP connector (FIGS. 3A–3C) are connected to the AGP only signals 304, and AGP and PCI signals 306 of the AGP/PCI bus 207 (FIG. 2). The pins 402 of the PCI connector(s) (FIGS. 4A–4C) are connected to the AGP and PCI signals 306, and PCI only signals 408 of the AGP/PCI bus 207 (FIG. 2).

Figure 5:
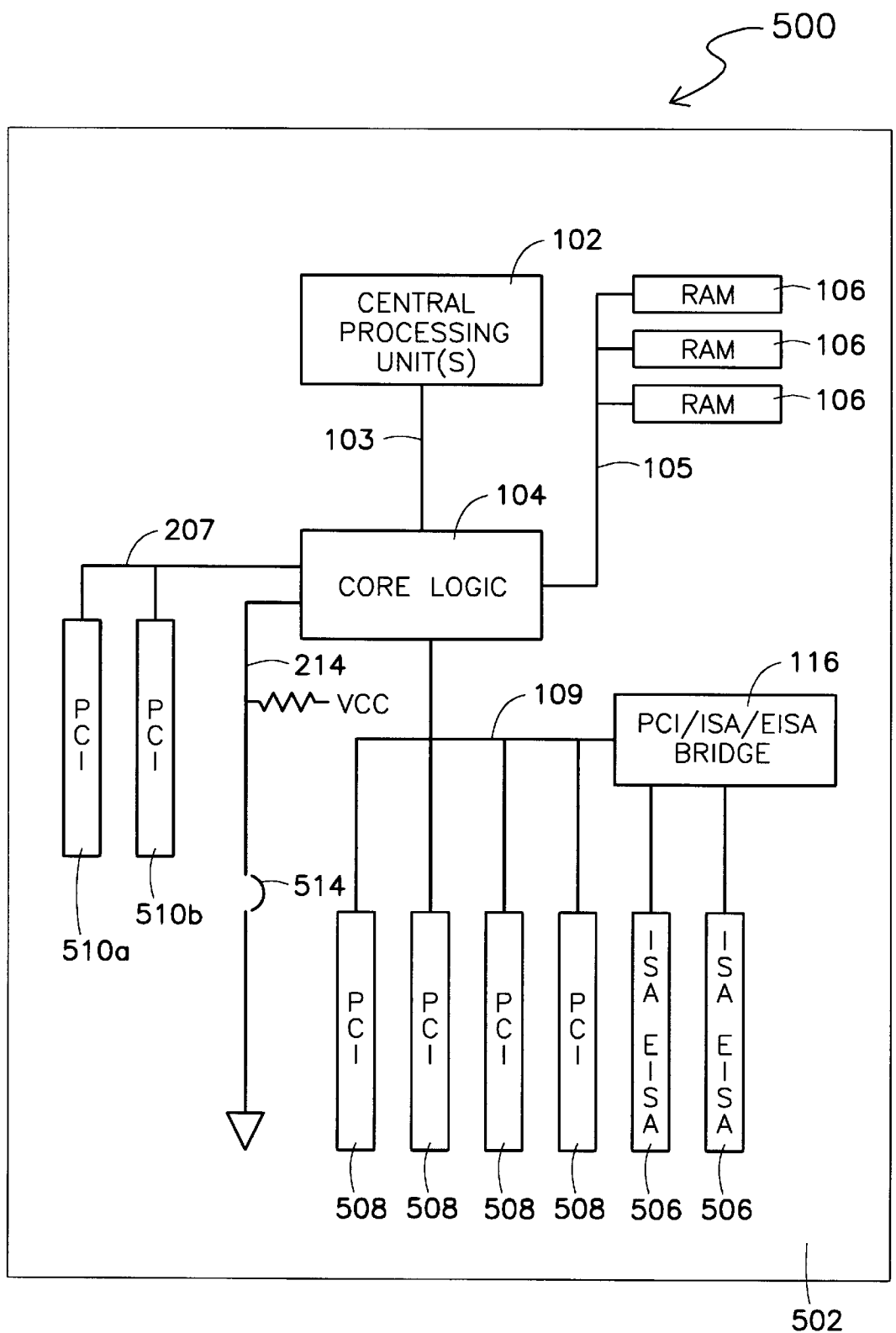
FIGS. 5 and 5A are schematic plan views of computer system motherboards, according to the present invention.
Figure 5A:
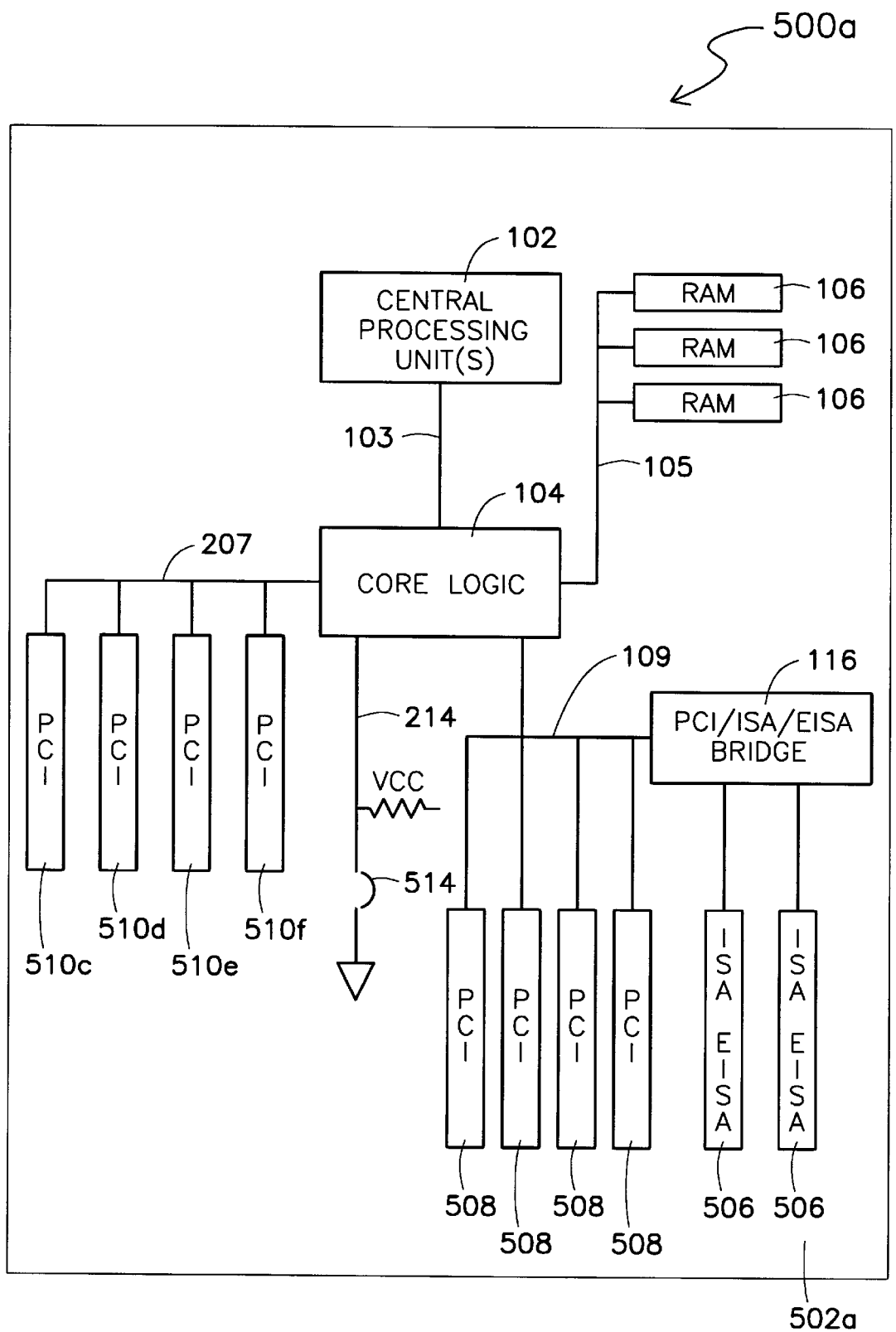

Referring to FIGS. 5 and 5A, schematic block diagrams of computer system motherboards are illustrated in plan view. The computer system motherboards 500 and 500a comprise printed circuit boards 502 and 502a, respectively, on which components and connectors are mounted thereto. The printed circuit boards 502, 502a comprise conductive printed wiring which is used to interconnect the components and connectors thereon. The conductive printed wiring (illustrated as buses 103, 105 109 and 207) may be arranged into signal buses having controlled impedance characteristics. On the printed circuit boards 502, 502a are core logic 104, CPU(s) 102, RAM 106, PCI/ISA/EISA bridge 116, ISA/EISA connector(s) 506, 32 bit PCI connectors 508 (primary PCI bus 109), and 32 bit PCI bus connectors 510. The printed circuit board 502 (FIG. 5) has two 32 bit PCI bus connectors 510a and 510b capable of operating up to 66 MHz. The printed circuit board 502a (FIG. 5A) has four 32 bit PCI bus connectors 510c, 510d, 510e and 510f capable of operating up to 33 MHz.

The core logic 104 is multiple use, operable as either an AGP interface or an additional 32 bit PCI interface, and may be configured for either an AGP interface or an additional PCI interface connected to the PCI connectors 510. Hardware jumper 514 may be utilized to select the core logic 104 interface AGP/PCI personality, or configuration registers within the core logic 104 may be set by software during system configuration or POST after enumerating the various computer system buses to determine what peripheral cards have been plugged into the system motherboards 500, 500a. A feature of the present invention allows automatic configuration of the core logic as an AGP interface if an AGP compliant card is detected on the universal bus (not illustrated) or as an additional PCI interface if a PCI card is detected in one or more of the PCI card connectors 510. The PCI connectors 508 are connected to the computer system primary PCI bus 109 (logical PCI bus number zero) which typically runs at 33 MHz. The primary PCI bus 109 (connectors 508) may be used for the slower 33 MHz PCI devices such as PCI/SCSI or PCI/IDE adapters. The additional 32 bit PCI bus connectors 510a and 510b may be used for the faster 66 MHz PCI devices which require higher data throughput (bandwidth) such as a video graphics controller card or high speed NIC. The additional 32 bit PCI bus connectors 510c, 510d, 510e and 510f may be used when more than six PCI device cards are required in the computer system, all running at 33 MHz.

Figure 6:
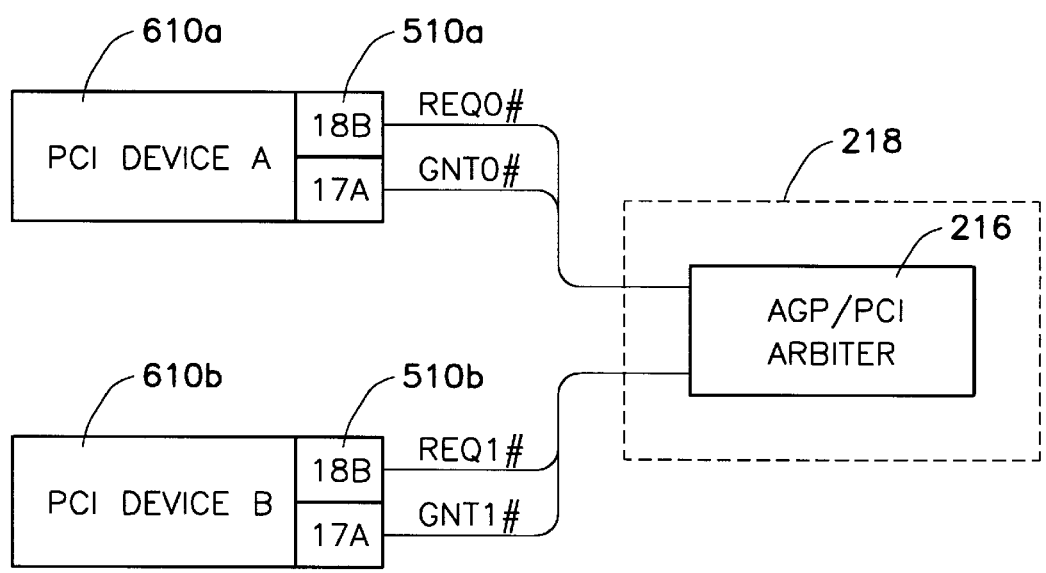
FIGS. 6 and 6A are schematic block wiring diagrams of portions of the embodiments of the present invention according to FIGS. 5 and 5A, respectively.
Figure 6A:
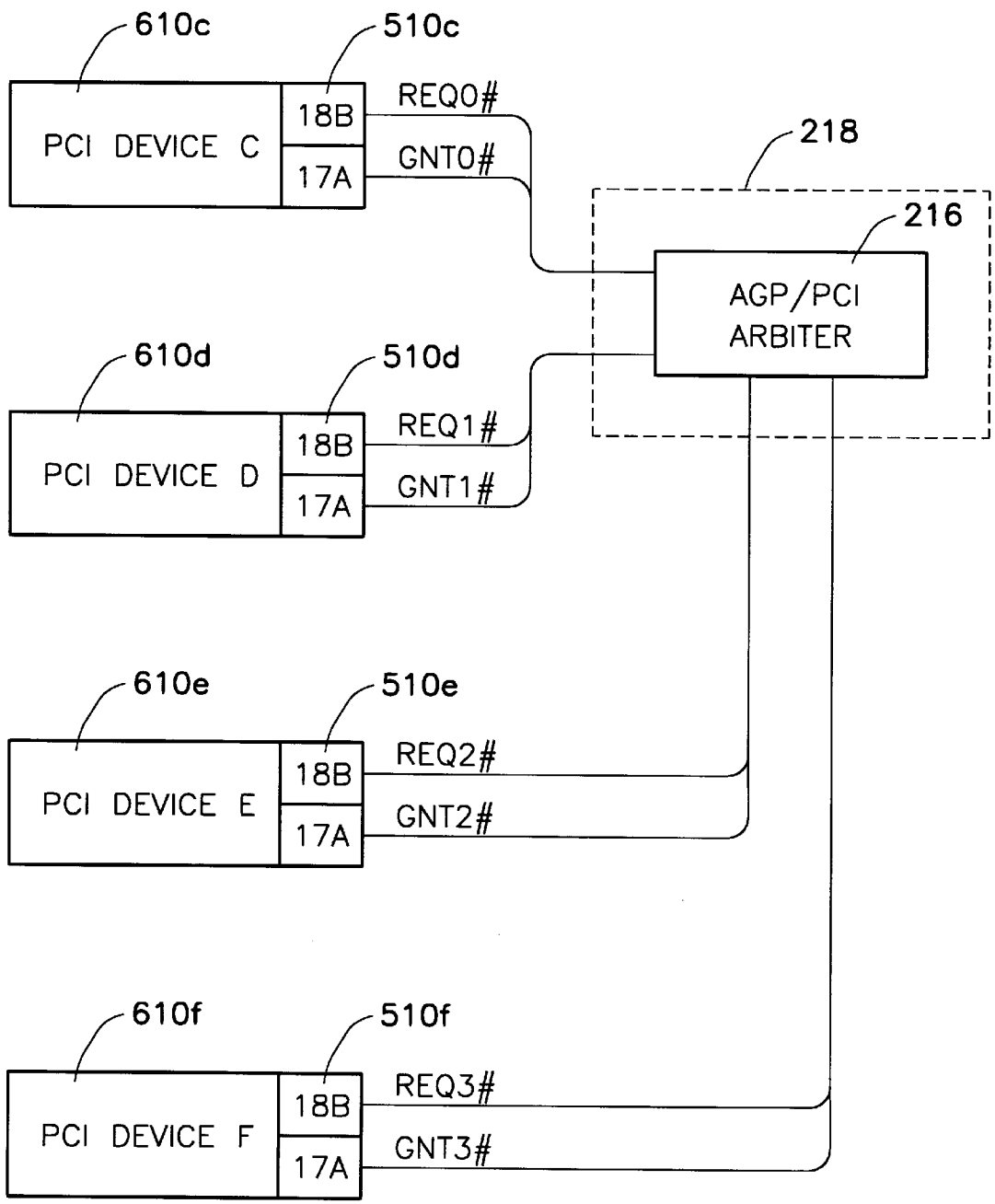

Referring now to FIGS. 6 and 6A, schematic block wiring diagrams of portions of the embodiments of the present invention according to FIGS. 5 and 5A, respectively, are illustrated. Each PCI device card inserted into the PCI connectors 510 require request (REQ#) and grant (GNT#) signals. According to the PCI specification, a PCI device is selected and allowed to become the PCI bus initiator when it asserts its respective REQ# signal onto the PCI bus and the PCI arbiter acknowledges the PCI device bus initiator request by asserting the respective GNT# signal back to PCI device requesting the PCI bus. In the multiple use core logic 104 of the present invention, a plurality of request and grant signals are available for either an AGP bus device or additional PCI bus devices 610. This is partially illustrated in FIG. 6 by PCI connector 510a connected to REQ0# and GNT0# signals, and PCI connector 510b connected to REQ1# and GNT1# signals all from the AGP/PCI logic 218 and AGP/PCI arbiter 216. Also illustrated in FIG. 6A by PCI connector 510c connected to REQ0# and GNT0# signals, PCI connector 510d connected to REQ1# and GNT1# signals, PCI connector 510e connected to REQ2# and GNT2# signals, and PCI connector 510f connected to REQ3# and GNT3# signals, all from the AGP/PCI logic 218 and AGP/PCI arbiter 216. Thus, the multiple use core logic chip set of the present invention may be configured for a computer system having either an AGP compliant bus, or an additional two card slot 66 MHz or four card slot 33 MHz, 32 bit PCI bus, depending only upon the configuration of the printed circuit boards 502 or 502a, respectively. In this way one multiple use core logic chip set may be utilized for many differently configured computer systems from simple portable and consumer personal computers to high end workstations and network servers.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chip set configurable for either an accelerated graphics port (AGP) bus or an additional peripheral component interconnect (PCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a second 32 bit peripheral component interconnect bus; and said core logic chip set configured as a fifth interface bridge between the random access memory bus and the second 32 bit peripheral component interconnect bus.

2. The computer system of claim 1, wherein the central processing unit is a plurality of central processing units.

3. The computer system of claim 1, wherein the core logic chip set is at least one integrated circuit.

4. The computer system of claim 3, wherein the at least one integrated circuit core logic chip set is at least one application specific integrated circuit.

5. The computer system of claim 3, wherein the at least one integrated circuit core logic chip set is at least one programmable logic array integrated circuit.

6. The computer system of claim 1, further comprising at least one peripheral component interconnect device capable of running at 66 megahertz and connected to the second 32 bit peripheral component interconnect bus running at 66 megahertz.

7. The computer system of claim 1, further comprising at least one peripheral component interconnect device capable of running at 33 megahertz and connected to the second 32 bit peripheral component interconnect bus running at 33 megahertz.

8. The computer system of claim 1, wherein the host bus, random access memory bus, first peripheral component interconnect bus, and second 32 bit peripheral component interconnect bus are on a computer system printed circuit board.

9. The computer system of claim 8, wherein the fourth and fifth interface bridges of said core logic chip set are configured for the second 32 bit peripheral component interconnect bus by an electrical signal sent from a hardwired jumper circuit located on the printed circuit board of the computer system.

10. The computer system of claim 8, wherein at least one peripheral component interconnect connector is on the printed circuit board and connected to the second 32 bit peripheral component interconnect bus.

11. The computer system of claim 1, wherein the fourth and fifth interface bridges of said core logic chip set are configured for the second 32 bit peripheral component interconnect bus by software control of said core logic chip set.

12. The computer system of claim 11, wherein the fourth and fifth interface bridges of said core logic chip set are configured for the second 32 bit peripheral component interconnect bus when a 32 bit peripheral component interconnect device is detected.

13. The computer system of claim 12, wherein configuration of said core logic chip set is done during power on self test of the computer system.

14. The computer system of claim 12, wherein configuration of said core logic chip set is done during configuration of the computer system.

15. A method, in a computer system, of configuring a core logic chip set for either an accelerated graphics port (AGP) bus or an additional peripheral component interconnect (PCI) bus, said method comprising the steps of:

providing a central processing unit connected to a host bus;

providing a random access memory connected to a random access memory bus;

providing a core logic chip set connected to the host bus and the random access memory bus;

configuring said core logic chip set as a first interface bridge between the host bus and the random access memory bus, a second interface bridge between the host bus and a first peripheral component interconnect bus, and a third interface bridge between the random access memory bus and the first peripheral component interconnect bus; and configuring said core logic chip set as a fourth interface bridge between the host bus and a second 32 bit peripheral component interconnect bus and a fifth interface bridge between the random access memory bus and the second 32 bit peripheral component interconnect bus when a configuration signal is applied to said core logic chip set.

16. The method of claim 15, wherein the configuration signal is applied to said core logic chip set when a peripheral component interconnect device is detected on the second 32 bit peripheral component interconnect bus.

17. The method of claim 16, wherein the peripheral component interconnect device is detected during a power on self test of the computer system.

18. The method of claim 16, wherein the peripheral component interconnect device is detected during a configuration of the computer system.

19. A core logic chip set configurable for either an accelerated graphics port (AGP) bus or an additional peripheral component interconnect (PCI) bus, comprising:

a core logic chip set adapted for connection to a central processing unit host' bus, random access memory bus, a first peripheral component interconnect bus, and an accelerated graphics port bus or a second peripheral 32 bit component interconnect bus;

said core logic chip set configured as a first interface bridge between the host bus and the random access memory bus, a second interface bridge between the host bus and the first peripheral component interconnect bus, and a third interface bridge between the random access memory bus and the first peripheral component interconnect bus;

said core logic chip set configured as a fourth interface bridge between the host bus and the second 32 bit peripheral component interconnect bus; and said core logic chip set configured as a fifth interface bridge between the random access memory bus and the second 32 bit peripheral component interconnect bus.

20. The core logic chip set according to claim 19, wherein the fourth and fifth interface bridges are configured by a hardware jumper applying a control signal to said core logic chip set.

21. The core logic chip set according to claim 19, wherein the fourth and fifth interface bridges are configured by software configuring a control register in said core logic chip set.

* * * * *